(12) United States Patent
Heady et al.

(10) Patent No.: US 6,313,049 B1
(45) Date of Patent: Nov. 6, 2001

(54) DISPOSABLE FABRIC-SATURATED SANITIZER WIPE(S) FOR FOOD INDUSTRY WITH SEALED CONTAINER PACKAGING THEREFOR

(76) Inventors: Dotty Heady; Kaz Wolkensperg, both of 400 N. 4th St., La Grange, KY (US) 40031

( * ) Notice: Subject to any disclaimer, the term of this patent is extended or adjusted under 35 U.S.C. 154(b) by 0 days.

(21) Appl. No.: 09/302,410

(22) Filed: Apr. 30, 1999

Related U.S. Application Data

(60) Provisional application No. 60/084,012, filed on May 4, 1998.

(51) Int. Cl.[7] ............................. B32B 27/04; B32B 27/12
(52) U.S. Cl. ...................... 442/123; 428/34.3; 428/34.2; 428/71; 428/76; 428/192; 428/907; 401/196; 401/200; 401/261; 15/244.3; D32/35; 424/404
(58) Field of Search ........................... 442/123; 428/907, 428/192, 71, 76, 34.2, 34.3; 401/200, 261, 196; 15/244.3; D32/35; 424/404

(56) References Cited

U.S. PATENT DOCUMENTS 5,762,948  6/1998  Blackburn et al. .................. 424/404

*Primary Examiner*—Elizabeth M. Cole
*Assistant Examiner*—Arti R. Singh

(57) ABSTRACT

Food industry disposable wet sanitizer wipe(s) (10) for food preparation surfaces, utensils, cooking instruments, containers and the like; using U.S. food industry approved legal sanitizer(s) and their respective legal solution parts per million of quaternary ammonium; chlorine/bleach and/or iodine which is saturated/impreganted into at least one absorbent fabric sheet(s) (11) and/or sponge(s) (12) which optionally may have at least one foldable line (13); such absorbent fabric and/or sponge is enclosed by at least one over-wrap (19) layer and sealed (26) on at least one border margin and/or side edge (21) thereof. A release-opening (22) permitting a food-related instrument and the like, to enter the sanitizer packet (20) from at least one exterior face (25) surface(s) of the packet (20) or blister pack (30). The packets and blister-packs may be non-articulated and/or articulated to each other by release lines of separation (24) which permit easy individual packet separation as desired.

21 Claims, 2 Drawing Sheets

US 6,313,049 B1

DISPOSABLE FABRIC-SATURATED SANITIZER WIPE(S) FOR FOOD INDUSTRY WITH SEALED CONTAINER PACKAGING THEREFOR

CROSS-REFERENCE TO RELATED APPLICATIONS

This is a parent application for examination referencing the provisional application entitled: SANITIZER-IMPREGNATED PACKETS FOR THE FOOD INDUSTRY Ser. No. 60/084,012 Filed May 04, 1998 having a 12 month provisional registration without examination.

FIELD OF THE INVENTION

This invention relates to the special formulation of sanitizer as approved by the Food Industry and United States Food and Drug Administration (FDA) which is uniquely applied in application and used in combination with saturated absorbent wipe(s) being pre-packaged as disposable towelettes/napkin/wipes to provide for the proper cleaning and sanitizing of food-related contact surfaces, utensils and containers when used with the preparation of food in accordance with the "sanitizer solution standards" as established by U.S. Federal Government, the F.D.A. as well as H.A.C.C.P (Hazard Analysis Critical Control Point) regulations which includes three sanitizers approved for food industry use being quaternary ammonium concentration solution, chlorine/bleach concentration solution and iodine concentration solution all of which have been tested, qualified and approved by the Environmental Protection Agency of the United States (EPA); U.S. Food and Drug Administration (FDA) under 21 CFR 178.1010; the United States Department of Agriculture (USDA) and the United States Department of Commerce (USDC). Accordingly, these four agencies are involved for the general public's safety and protection from pathogens and the protection of food from spoilage.

BACKGROUND OF THE INVENTION

For years society has enjoyed the innovation and benefits of pre-moistened towelettes fabric wipes which are usualLy found in tear-open sealed pouch for use when travelling, in restaurants, and the like, which are commonly saturated with alcohol, isopropyl, lotions, etc. However, these stated substances are not allowed nor permitted in use within the food industry when sanitizing food preparation surfaces, utensils, equipment containers, food instruments and the like.

The present invention relates to application of providing food industry approved sanitizing-solutions using the appropriate legal concentration parts per million (PPMs) as established by the U.S. Federal Government regulations to wet-saturate disposable fabric(s) and/or sponge(s) prior to pre-packaging, or over-wrapping the absorbent fabric and/or sponge wipes.

Food safety-scientists are aware that pathogens can multiply quickly, and sometimes, it only takes a few. It is therefore required, that procedures to maintain high-assurances of pathogen-free, food-contact surfaces be essential to safe-guard the public and be strictly adhered to in compliance with the United States regulations as PPM standards of permissible legal concentration PPM levels have been developed as can be found in the Federal Code of Regulations pertaining to such.

Some of the noted deficiencies in the food industry when working around food preparation are: the conditions of the kitchens and equipment; people wiping equipment with their clothing/aprons; chefs and cooks cleaning thermometers with alcohol—which is not a U.S.Government approved sanitizer—; workers handling non-food surfaces/objects, eating, coughing using their hands then handling kitchen equipment, utensils and patron food stuffs; chefs and cooks using either, a too weak of sanitizer solution mixture of PPMs, which is rendered ineffective against bacteria; or contrarily, too strong of a sanitizer solution which then becomes legally toxic.

It is with these and other aforestated problematic concerns coupled with the notion of public safety in mind, that the present invention which comprises one or more disposable pre-packaged fabric-saturated wet absorbant wipes and/or impregnated fabric(s) and/or sponges; for example, such as paper and/or cotton towelette/napkin wipe(s) uniquely processed with the food industry legal sanitizer solution(s) as established by the U.S. Federal Government regulations and respective governmental agencies. Since, the most noted violations in the food service industry occur from the improper use of sanitizers; specifically, the incorrect PPM level of mixture; either too low of sanitizer PPM level or to high in concentration PPM level. Generally, managers in food service preparation do not know the required legal strength of the particular sanitizer they are using, nor do they know how to check and measure the concentration level of the sanitizer they are using.

Further, most food service workers do not have knowledge of the sanitizer which is being used and the means in which to insure that the exact legal PPM range levels of concentration is achieved; and properly used in the food service industry on food contact surfaces, equipment, utensils, etc. Such wide spread ignorance is creating a major food safety problem. Should the sanitizer concentration parts per million (PPM) be too low, the sanitizer is rendered ineffective, thus resulting in potential food and cross-food contamination being served. Conversely, should the sanitizer become mixed at higher PPM concentration beyond the legal limit of PPMs, the solution then becomes toxic. For these reasons the U.S. federal government has strict regulations establishing the strict legal range of PPM levels of concentration for quaternary ammonium solution, chlorine/bleach solution and iodine solution.

The present invention reduces time management from the aspect of eliminating the need by personnel to properly prepare mixture and precisely measure same for accuracy, prior to use, to insure that such exact legal range of sanitizer-solution PPMs is met. This takes the onus off the food personnel, which statistically speaking, have a high turn-over rate in the food industry as it is, especially within the food service sector. Further, the wage scale paid to this personnel and difficulties resulting by language barriers makes training very difficult and almost seemingly non-existent; also their lack of understanding the importance of our government demands for food-safety, that cannot be over-emphasized.

The conditions described above create an atmosphere that is prone to cause outbreaks of foodborne illness in the consuming public.

Consequently, the food industry and various sub-industries need and can embrace the present invention which is the pre-packaged wet sanitizer fabric saturated wipe(s)—just as the public has embraced the pre-packaged alcohol sterlizer packets used in the medical field and the moist towelettes type packets available in most supermarkets. As stated, alcohol is a non-approved and illegal sanitizer for food service use in the United States. Further, many popular wipes/towelettes use types of alcohol, including scents and may contain lotions, all of which are incompatible with food contact surfaces.

SUMMARY OF THE INVENTION

The present invention consists of a unique product and useful application for sanitizing food-related objects and surfaces using fabric saturated/impregnated absorbent sheet (s) and/or one-time use sponge with the U.S government approved legal concentrated parts per million (PPM) solutions of quaternary ammonium, chlorine/bleach solution and iodine solution all U.S. government approved legal solutions for sanitizing food preparation surfaces, utensils and equipment, etc.

Todate, there is no comparable disposable wipe packet product or prior art in the food industry that teaches the features of the present invention having a saturated/impregnated absorbent fabric sheet(s) and/or sponge(s) with the approved U.S. food-related legal concentration of sanitizer having a single sheet layer or laminated bonded material over-wrap packet.

An object of the pre-packaged fabric-saturated sanitizer of the present invention is designed to address and be utilized specifically for legal sanitizing of food-preparation surfaces, food equipment, utensils, containers and the other instruments used such as thermometers, knife blades, etc.

A further object of the present invention is to teach that the over-wrap substrate may be made from single layer or multiple layer sheet may have at least one line of separation and/or at least one border margin and/or edge sealed; or, in the alternative, two or more separate over-wrap sheets may also be laminated and sealed on at least one border margin and/or edge of the packets and/or blister packs thereof. Each packet or blister-pack may have at least one sealed edge and/or sealed border margin.

DETAILED DESCRIPTION OF THE DRAWINGS

Figure 1:
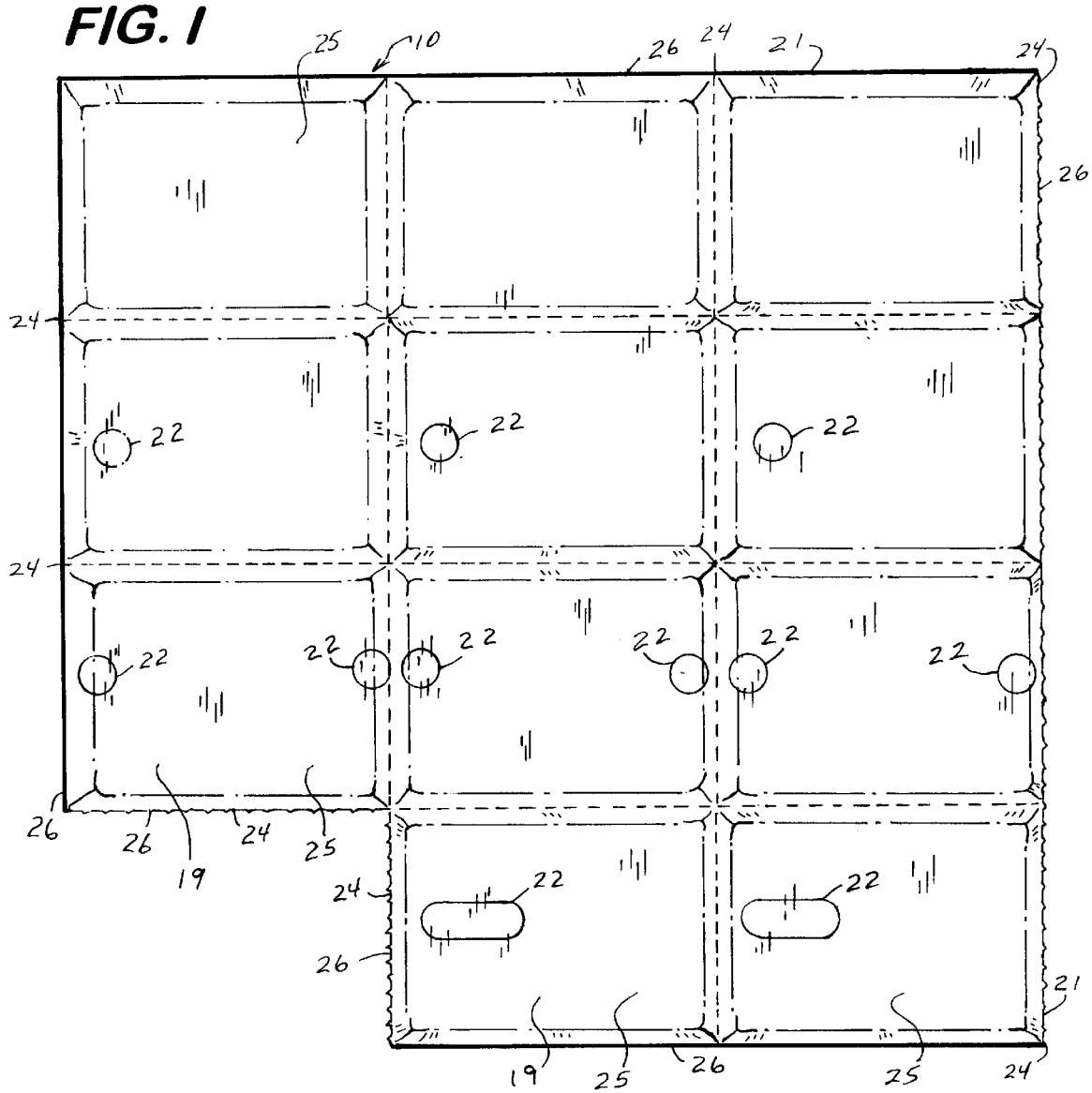
FIG. 1 is a top elevational plan view of multiple articulated packets containing the fabric-saturated U.S approved sanitizer legal solution concentration thereof.

The present invention is comprised of a food industry approved legal santizer mixture being material-saturated and/or impregnated on one-time use disposable wipe(s) 10, made of fabric 10 and/or sponge 12 enclosed by sealed 26 over-wrap packet 20 as shown in FIG. 1 and removed from sealed package, in one version, for wiping food equipment, containers, food preparation surfaces and utensils by a user. The present invention in FIG. 1. comprising at least one multi-faced fabric absorbent sheet having at least one layer and/or sponge(s). Both fabric and/or sponge may optionally have at least one foldable line 13 to reduce the physical dimensional size for packaging into the pre-determined sized selected-type packaging.

The sponge and/or at least one multi-faced fabric absorbent sheet(s) wipes 10 for example, may be made of cotton, paper towelette, or suitable absorbent fabric or combinations thereof, which then is saturated/impregnated by at least one legal U.S. Food industry approved sanitizer with the respective solution(s) at the proper legal concentration range in parts per million (PPM) as established by the U.S. Federal Government disclosed herein.

The sponge 12 and/or at least one layer multi-faced saturated and/or impregnated fabric 11, wipe(s) 10 being enclosed by at least one protective over-wrap 19 which may form at least one over-wrap packet 20 which may be of plastic, polypropylene, or other suitable impervious sheet material, and the like. Or, in the alternative, a multi-layer over-wrap 19 may be a of bonded laminate type; e.g. paper and foil laminate combination; or, paper may be laminated with mylar or polypropylene or plastic or any other product of a suitable property nature.

Figure 2:
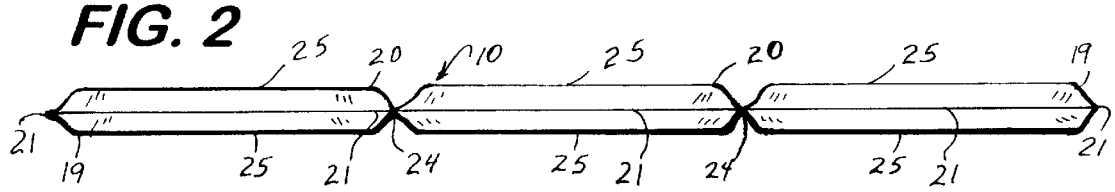
FIG. 2 is a side elevational plan view thereof.

The at least one protective overwrap 19 layer is formed by at least one substrate sheet as shown in FIG. 2 and then machine sealed 26 to isolate and contain each absorbent fabric into packet forms 20,30; each "tear-open" packet 20 being tornably-opened by the user to expose said pre-packaged contained fabric-saturated absorbent sheet(s) wipes 10; made of fabric 11 and/or sponge(s) 12 prior to application by a user.

In the alternative, each packet design may optionally contain a pre-determined release-opening 22 for the insertion of utensil such as a thermometer, knife blade, fork, etc. which may be designed as a push-through pre-determined release-opening formed by die/scored line, and the like; to access the U.S. food-related approved legal concentrated sanitizer solution found on saturated fabric(s) and/or sponge (s) contained within the sealed packet 20 and/or blister pack 30.

The pre-packaged fabric-saturated absorbent sheet(s) and/or sponge(s) using U.S. food-industry legal solution is at least one of the food-approved legal concentrated solutions taken from the group consisting of quaternary ammonium solution, chlorine solution and iodine solution.

The food-industry approved solutions having the legal parts per million for quaternary ammonium solution is from exactly 150 PPM to exactly 200 PPM (0.0150% to exactly 0.0200%); wherein the legal parts per million for chlorine solution as legally established is from exactly 50 PPM to exactly 200 PPM (from exactly 0.0050% to exactly 0.0200%) and the legal parts per million concentration for iodine from exactly to 12.5 PPM to exactly 25 PPM (exactly 0.00125% to exactly 0.00250%).

The pre-packaged consumer hand wipe solution(s) which cannot be used in the food industry and is not legal and not approved for the food industry is alcohol and lotion solutions. This means that the present invention is free from any alcohol solution and cannot utilize lotions for hands, etc. which have not been approved for use with food preparation and food contact surfaces in the United States.

Further, each sanitized fabric and/or sponge wipe packet is formed from at least one sealed protective over-wrap layer and are articulated packet-to-packet to each other, by at least one fracture break-away release line of separation(s) 24, and/or the packets may be non-articulated, as individually formed packets.

Figure 3:
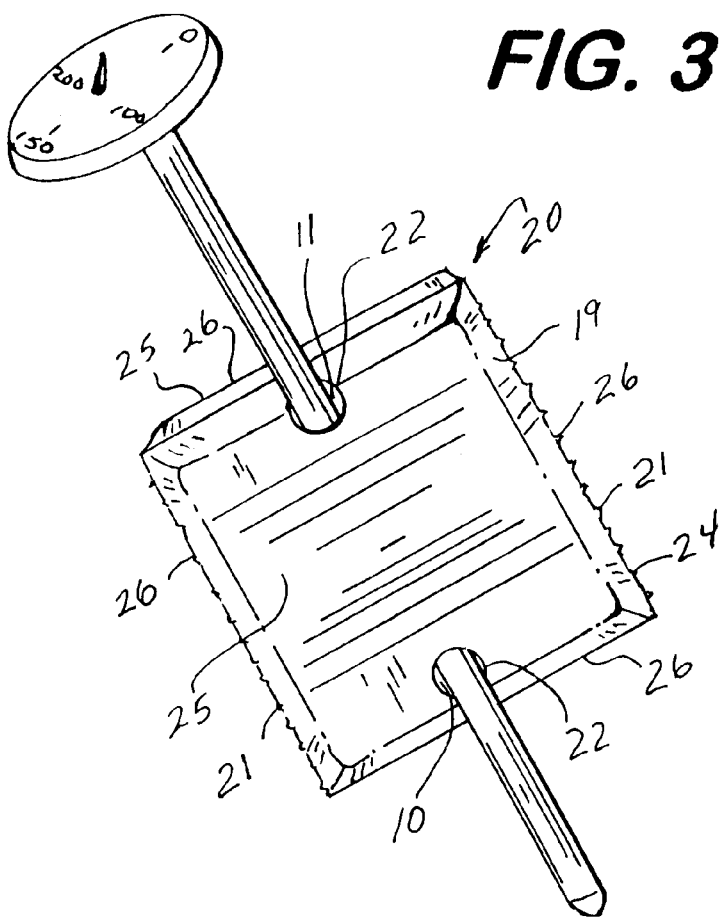
FIG. 3 is another variation of the articulated packets each having at least one release-opening to insert desired instrument therein; and, FIG. 4 is another variation showing an individual blister-pack with optional at least one release-opening(s) positioned thereon containing fabric-saturated sanitizer.
Figure 4:
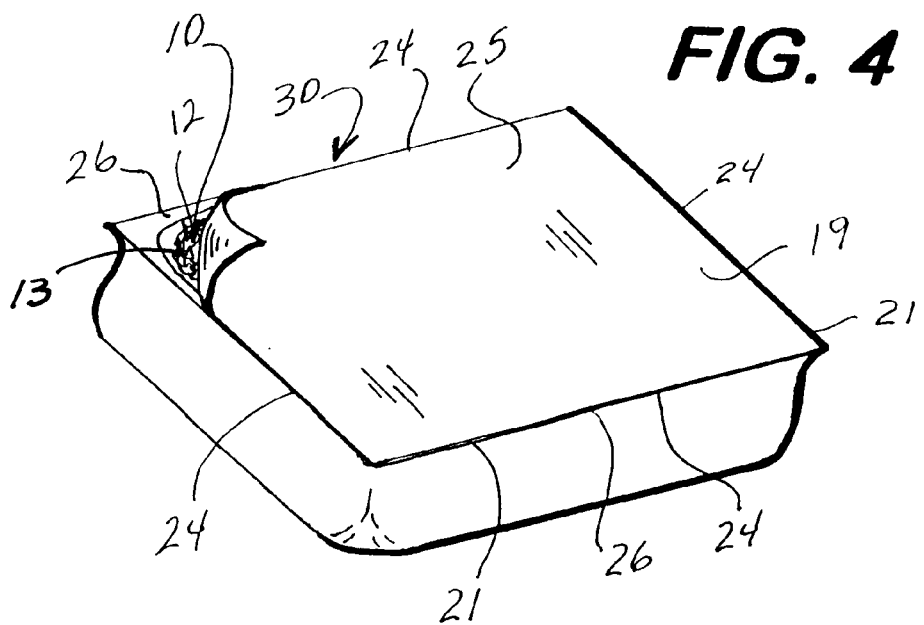

Each packet face surface may optionally have at least one pre-determined release-opening 22 as in FIG. 3 on at least one face surface 25 of the packet 20 for ease of insertion of desired food instrument therethrough at least one exterior packet face surface 25 or surfaces. The preferred location of at least one release-opening 22 is generally positioned on at least one face surface near at least one sealed edge 26.

The sanitizer wipes 10; fabric(s) 11 and/or sponge(s) 12, further may be compartmentalized and each compartment may contain one or more absorbent fabric sheet(s) 11 and/or sponge(s) 12 each compartment having one desired said food-approved legal solution to saturate/impregnate same.

The packet dimensions may be formed in a variety of dimensions and sizes; for example: 1¾" by 2⅛"; 3½" by 7½"; 5½" by 8½"; 8½" by 11"; 4½" by 5" Although these sizes are cited, other packet sizes, as needed, may be created by the designer at will.

Further, three dimension "box-type" packets may be created, for example such as L5"×W8"×H¼" packets. Other sizes of this type may be created by the designer at will.

In further contemplation of the foregoing packaged saturated wipe(s) 10 being fabric(s)11 and/or sponge(s) 12 enclosed in overwrap packet 20, pouch, or blister pack 30 with sealable foil-lid and/or liner; in this production method, the food-related U.S. approved legal concentration of sanitizer-solution as selected is applied and saturates the absorbent fabric(s) and/or sponge(s); the individual saturated-fabric(s) and/or sponge(s) are strategically placed in position permitting the over-wrap substrate 19 to enclose same; either a single layer or multiple layer to be applied in over-wrapping 20; then sealing at least one border margin and/or edge sealed packets. The sealing 26 edge(s) and/or border margin may also provide the means to fracture and release the articulated packets therebetween by the use of perf lines, die cut lines, score and/or tear line or any other lines of separation 24 as desired by the designer at will.

In the alternative, the fracture lines formed by at least one line of separation 24 may be performed in operation, independently or in combination with other production/processes.

Accordingly, while example embodiments of this invention have been described and illustrated for the purpose of clarity and understanding, this invention should not considered limiting as variations and modifications will be obvious to those skilled in the art without departure from the spirit and scope of the present invention as set forth in the appended claims.

What is claimed is:

1. A legal quaternary ammonium solution penetrated in disposable fabric-saturated sanitizer wipes(s) and pre-packaged for food preparation utensils/equipment required in government regulated food industry, said pre-packaged solution absorbent sanitizer wipes comprising:
at least one multi-faced abosrbent fabric sheet means having at least one foldable line means for fitting the pre-determined compartment of the over-wrap packet;
said at least one multi-faced absorbent fabric sheet means being saturated by at least one U.S. Food industry approved legal solution means;
said at least one multi-faceted absorbent fabric sheet means being enclosed by at least one protective over-wrap layer means; and,
said at least one protective overwrap layer means forming at least one sealed compartment package means to each packet form means which is opened to expose said saturated multi-face fabric(s) absorbent sheet means prior to application by a user.

2. The pre-packaged fabric-saturated absorbent sheet means as in claim 1 wherein the U.S. food-industry legal solution is at least one of the food-approved legal solutions taken from the group consisting of quaternary ammonium solution, chlorine solution and iodine solution.

3. The food-industry approved solution(s) as in claim 2 wherein the legal parts per million for quaternary ammonium solution is from exactly 150 PPM to exactly 200 PPM (exactly 0.0150% to exactly 0.0200%), wherein the legal parts per million for chlorine solution is from exactly 50 PPM to exactly 200 PPM (from exactly 0.0050% to exactly 0.0200%); and the legal parts per million concentration for iodine from exactly 12.5 PPM to exactly 25 PPM (exactly 0.00125% to exactly 0.00250%).

4. The pre-packaged fabric-saturated absorbent sheet(s) as in claim 1 wherein the food industry approved legal solution is without alcohol means and, wherein the U.S. food industry approved legal solution is without lotion means.

5. The pre-packaged fabric-saturated absorbent sheet(s) as in claim 1 wherein said at least one protective over-wrap layer means forming at least one packet is at least one of articulated to each other and non-articulated; and, wherein optionally each packet having at least one solution saturated fabric compartment wherein each packet is taken from the group consisting of over-wrap packets, sealed-bag ends(s) and blister pack.

6. The pre-packaged fabric-saturated absorbent sheet(s) as in claim 1 wherein said packet optionally has at least one pre-determined release-opening means on at least one face of the packet face surface for insertion therethrough the single packet face with a physical object.

7. The prepackaged fabric-saturated absorbent sheet(s) as in claim 1 wherein each said packet enclosure has at least one fabric over-wrap absorbent sheet each having one said industry approved legal solution to saturate/impregnate same and wherein optionally said solution-saturated fabric sheet is alternately of sponge means.

8. A sealed protective over-wrap packet containing disposable one-time use absorbent wipe(s) with food industry legal sanitizing solution for sanitizing kitchen utensils/equipment and the like comprising:
at least one multi-faceted fabric absorbent sheet means being saturated by at least one U.S. Food Industry approved legal solution type means;
said at least one multi-faced fabric absorbent sheet means being enclosed by at least one protective over-wrap layer means; and,
said at least one protective over-wrap means forming at least one sealed compartment package means which is tornably-opened to expose said at least one saturated multi-faced fabric absorbent sheet means prior to application of the disposable wipe(s) by a user.

9. The pre-packaged saturated absorbent sheet means as in claim 8 wherein the U.S. food-industry legal solution is at least one of the food-approved legal solutions taken from the group consisting of quaternary ammonium solution, chlorine solution and iodine solution, and wherein optionally the fabric sheet is impregnated with the desired said legal solution means type.

10. The food-industry approved solutions as in claim 9 wherein the legal parts per million for said quaternary ammonium solution is from exactly 150 PPM to exactly 200 PPM (exactly 0.0150% to exactly 0.0200%), wherein the legal parts per million for chlorine solution is from exactly 50 PPM to exactly 200 PPM (from exactly 0.0050% to exactly 0.0200%); and the legal parts per million concentration for iodine from exactly 12.5 PPM to exactly 25 PPM (exactly 0.00125% to exactly 0.00250%).

11. The sealed pre-packaged saturated absorbent sheet as in claim 8 wherein the food industry approved legal solution for saturating is without alcohol means and, wherein the food industry approved solution is without lotion means; wherein optionally the fabric means is impregnated with the desired legal solution.

12. The sealed pre-packaged saturated absorbent sheet as in claim 8 wherein said at least one protective over-wrap layer is at least one of articulated and non-articulated and wherein optionally each packet has at least one solution saturated-fabric means compartment.

13. The sealed pre-packaged saturated absorbent sheet as in claim 8 wherein said packet optionally has at least one pre-determined release-opening means on at least one face of the packet face surface for insertion therethrough at least one exterior face surface of the packet.

14. The sealed pre-packaged saturated absorbent sheet as in claim 8 wherein each packet enclosure has at least one fabric absorbent sheet each layer having one said food-approved legal solution to saturate/impregnate same and wherein optionally, said saturated fabric sheet is made of sponge means, and wherein optionally each packet having at least solution saturated fabric compartment wherein each packet is taken from the group consisting of over-wrap packet, sealed-bag end(s) and blister pack.

15. A sponge type absorbent wipe(s) in a legal food grade sanitizer solution and pre-packaged in a sealed container prior to use comprising:

at least one absorbent sponge means being saturated for one-time use with at least one U.S. food industry approved legal sanitizing solution means;
said at least one absorbent sponge means being enclosed and sealed with at least one protective packaging layer means; and
said at least one protective packaging layer means forming at least one sealed compartment means being opened to expose said saturated sponge surface means prior to one-time use wiping application by user.

16. The pre-packaged saturated absorbent sponge means as in claim 15 wherein the U.S. food-industry legal solution is at least one of the food-approved legal solutions taken from the group consisting of quaternary ammonium solution, chlorine solution and iodine solution.

17. The food-industry approved solutions as in claim 16 wherein the legal parts per million for said quaternary ammonium solution is from exactly 150 PPM to exactly 200 PPM (exactly 0.0150% to exactly 0.0200%), wherein the legal parts per million for said chlorine solution is from exactly 50 PPM to exactly 200 PPM (from exactly 0.0050% to exactly 0.0200%) and the legal parts per million concentration for said iodine is from exactly to 12.5 PPM to exactly 25 PPM (exactly 0.00125% to exactly 0.00250%).

18. The pre-packaged saturated absorbent sponge means as in claim 15 wherein the food industry approved legal solution is without alcohol means and, wherein the food industry approved legal solution is without lotion means.

19. The pre-packaged saturated absorbent spong means as in claim 15 wherein said at least one protective over-wrap means to form at least one packet being at least one of articulated and non-articulated, wherein optionally each packet is taken from the group consisting of at least one sealed over-wrap layer, sealed-bag end(s) and sealed blister pack.

20. The pre-packaged saturated absorbent sponge means as in claim 15 where in said packet optionally has at least one pre-determined release-opening means on at least one face of the predetermined packet surface face for insertion through at least one layer of said face surface of the packet.

21. The pre-packaged saturated absorbent sponge means as in claim 15 wherein each packet enclosure has at least one sponge means and/or fabric absorbent sheet means each having one said food-industry approved legal solution to saturate/impregnate same; wherein optionally said at least one packet/pack compartment having at least one saturated fabric and or sponge means.

* * * * *